United States Patent
Wang

(10) Patent No.: US 7,995,857 B2
(45) Date of Patent: Aug. 9, 2011

(54) METHOD AND APPARATUS UTILIZING STEP-WISE GAIN CONTROL FOR IMAGE PROCESSING

(75) Inventor: Hsin-Chung Wang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1009 days.

(21) Appl. No.: 11/849,349

(22) Filed: Sep. 3, 2007

(65) Prior Publication Data
US 2009/0060374 A1    Mar. 5, 2009

(51) Int. Cl.
*G06K 9/48* (2006.01)
*G06K 9/40* (2006.01)
(52) U.S. Cl. ......... 382/266; 382/199; 382/264; 382/275
(58) Field of Classification Search .................. 382/165, 382/167, 190, 199, 219, 220, 250, 251–252, 382/255–256, 260–266; 348/610, 615, 622, 348/625, 627; 358/3.26, 3.27, 532, 537, 358/540, 463, 464
See application file for complete search history.

(56) References Cited

U.S. PATENT DOCUMENTS

| | | | |
|---|---|---|---|
| 6,285,798 B1 * | 9/2001 | Lee | 382/260 |
| 6,628,842 B1 * | 9/2003 | Nagao | 382/266 |
| 6,735,330 B1 * | 5/2004 | Van Metter et al. | 382/132 |
| 6,965,416 B2 * | 11/2005 | Tsuchiya et al. | 348/606 |
| 7,130,483 B2 * | 10/2006 | Kim | 382/266 |
| 7,433,536 B2 * | 10/2008 | Kim | 382/266 |
| 7,515,160 B2 * | 4/2009 | Kerofsky | 382/254 |
| 7,602,447 B2 * | 10/2009 | Arici et al. | 348/687 |
| 2002/0047911 A1 * | 4/2002 | Tsuchiya et al. | 348/252 |
| 2002/0067862 A1 * | 6/2002 | Kim | 382/266 |
| 2007/0188623 A1 * | 8/2007 | Yamashita et al. | 348/222.1 |

OTHER PUBLICATIONS

G. Ramponi, N. Strobel, S. K. Mitra, and T.-H. Yu, "Nonlinear unsharp masking methods for image contrast enhancement," J. Electron. Imag.,vol. 5, No. 3, pp. 353-366, 1996.*

* cited by examiner

*Primary Examiner* — Gregory M Desire
*Assistant Examiner* — Andrae S Allison
(74) *Attorney, Agent, or Firm* — Winston Hsu; Scott Margo

(57) ABSTRACT

An apparatus for image processing includes: an edge detection module, for performing an image edge detection for each pixel in an original image data and generating at least one edge detection result for a target pixel in the original image data; a step-wise gain controlling module, coupled to the edge detection module, for determining at least one gain coefficient of the target pixel according to the edge detection result; and a calculation module, coupled to the step-wise gain controlling module, for adjusting an original gray value of the target pixel to generate an output gray value of the target pixel according to the gain coefficient.

18 Claims, 8 Drawing Sheets

METHOD AND APPARATUS UTILIZING STEP-WISE GAIN CONTROL FOR IMAGE PROCESSING

BACKGROUND OF THE INVENTION

1. Field of the Invention

The present invention relates to image processing, and more particularly, to a method and apparatus for adjusting image sharpness by using a step-wise gain control mechanism.

2. Description of the Prior Art

A conventional image processing apparatus 100 shown in FIG. 1 is provided to enhance the sharpness of image edges. The image processing apparatus 100 comprises a high-pass filter 110, a multiplier 120, a coring operation unit 130 and an adder 140. The high-pass filter 110 performs a high-pass filtering operation for an original incoming image data and generates a high-pass filtering result. Then the multiplier 120 multiplies the high-pass filtering result by a parameter khp to generate an edge detection result. Afterwards, the coring operation unit 130 performs well-known coring operations for the edge detection result with an input-to-output relation as shown in FIG. 2. Finally, the adder 140 sums up the original image data and an operation result of the coring operation unit 130 to generate an adjusted image data.

Please refer to FIG. 2. FIG. 2 is a schematic diagram illustrating an input-to-output relation of a typical coring operation. When an absolute value of an input value falls within a range between zero and a threshold value th_c, the output value is set to zero, and when an absolute value of an input value is greater than the threshold value th_c, the input value is, for example, closer or equal to the output value. In the prior art apparatus shown in FIG. 1, the input value represents the edge detection result while the output value represents the coring operation result of the coring operation unit 130.

However, before being processed by the coring operation, the input values may vary in a range due to noise interference. Therefore, the closer the input value is to the threshold value th_c, the greater the output value variation (jumping between zero and a value near d1) due to the noise interference. For example, if during a period in which the original image data are static, ideally the adjusted image data are also static; however, due to the noise influence mentioned above, some pixels of adjusted image data may have different gray values during this period, and what's worse, these different gray values of the pixels are concentrated around the value d1 and 0. As a result, the flicker occurs and the image quality degrades greatly.

On the other hand, in the image edge of the original image data, the edge detection result is large enough to make the summation of the coring operation result and the gray value of the original image data greater than 255; that is, the gray value of the adjusted image data is greater than 255 and exceeds the maximum gray value that can be displayed. Therefore white points occur at the image edge during the image processing shown in FIG. 1 and this phenomenon is called "overshoot".

Flicker and overshoot are the side effects of the conventional image edge processing apparatus 100, and seriously influence the image quality.

SUMMARY OF THE INVENTION

It is therefore one of the objectives of the claimed invention to provide a method and an apparatus for adjusting image sharpness through a step-wise gain control, to solve the above-mentioned problems and enhance the image quality.

According to one embodiment of the claimed invention, an image processing apparatus comprises: an edge detection module, for performing an image edge detection for each pixel in an original image data and generating at least one edge detection result for a target pixel in the original image data; a step-wise gain controlling module, coupled to the edge detection module, for determining at least one gain coefficient of the target pixel according to the edge detection result; and a calculation module, coupled to the step-wise gain controlling module, for adjusting an original gray value of the target pixel to generate an output gray value of the target pixel according to the gain coefficient.

According to one embodiment of the claimed invention, an image processing method comprises: performing an image edge detection for each pixel in an original image data and generating at least one edge detection result for a target pixel in the original image data; determining at least one gain coefficient of the target pixel according to the edge detection result; and for adjusting an original gray value of the target pixel to generate an output gray value of the target pixel according to the gain coefficient.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
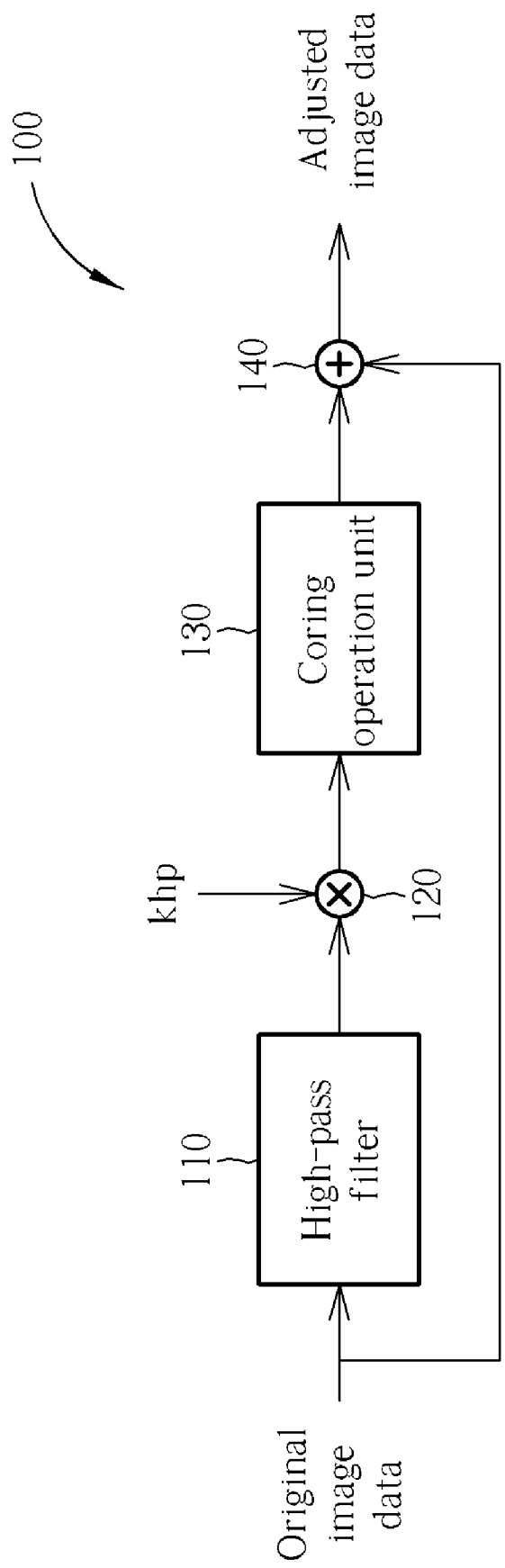
FIG. 1 is a prior art image processing apparatus.
Figure 2:
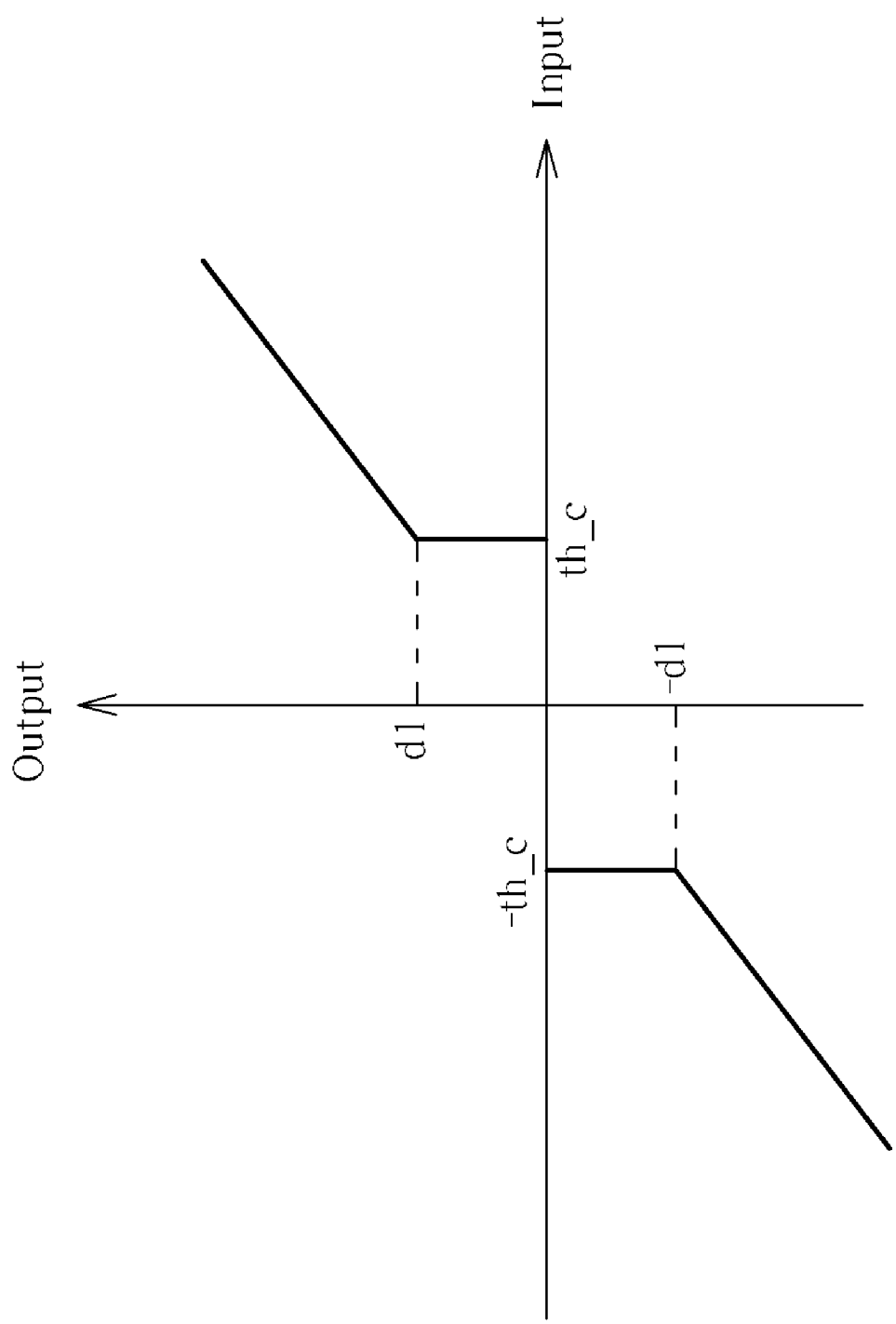
FIG. 2 is a schematic diagram of input-to-output relation of a typical coring operation.
Figure 3:
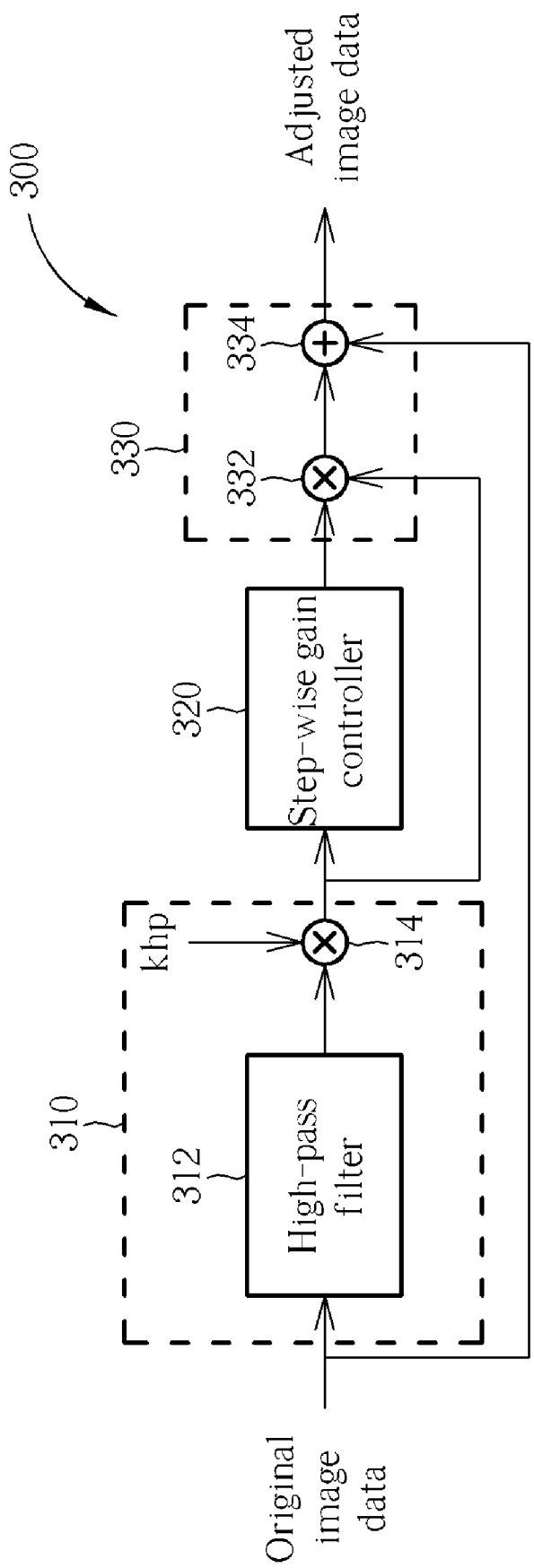
FIG. 3 is an image processing apparatus according to a first embodiment of the present invention.

Please refer to FIG. 3. FIG. 3 is an image processing apparatus 300 according to a first embodiment of the present invention. In this exemplary embodiment, the image processing apparatus 300 comprises an edge detection module 310, a step-wise gain controller 320 and a calculation module 330. As shown in FIG. 3, the edge detection module 310 comprises a high-pass filter 312 and a first multiplier 314; and the calculation module 330 comprises a second multiplier 332 and an adder 334.

Figure 4:
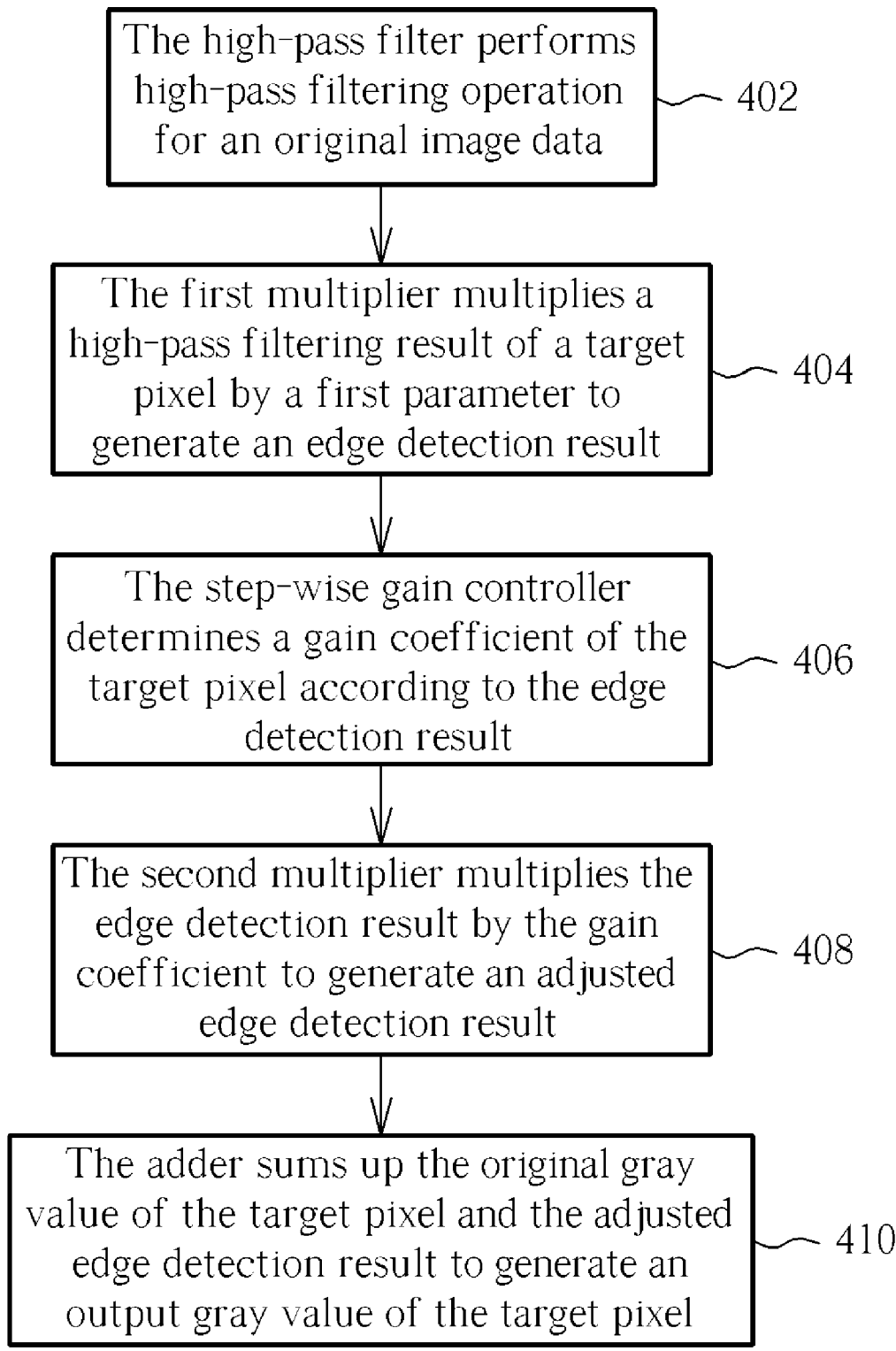
FIG. 4 illustrates a flowchart of the operations of the image processing apparatus shown in FIG. 3.

Please refer to FIG. 3 in conjunction with FIG. 4. FIG. 4 illustrates a flowchart illustrating operations of the image processing apparatus 300 shown in FIG. 3. Provided that the result is substantially the same, the steps are not limited to be executed according to the exact order shown in FIG. 4. Referring to the flowchart, the operations of the image processing apparatus 300 are further described as follows.

In Step 402, the high-pass filter 312 performs a high-pass filtering operation on the original image data, and then in Step 404, the first multiplier 314 multiplies a high-pass filtering result HPF of a target pixel by a first parameter kph to generate an edge detection result ΔP. In Step 406, the step-wise gain controller 320 determines a gain coefficient Cg of the target pixel according to the edge detection result ΔP. In Step 408, the second multiplier 332 multiplies the edge detection result ΔP by the gain coefficient Cg to generate an adjusted edge detection result ΔP'. And finally, in Step 410, the adder 334 sums up the original gray value P of the target pixel and the adjusted edge detection result ΔP' to generate an output gray value P' of the target pixel. The formulas of the above operations are as follows:

$$\Delta P = khp * HPF \quad (1)$$

$$\Delta P' = \Delta P * Cg \quad (2)$$

$$P' = P + \Delta P' \quad (3)$$

Therefore the operation of a pixel is completed, and then the image processing apparatus 300 sequentially performs the above-mentioned operations on every pixel to generate an adjusted image data.

Figure 5:
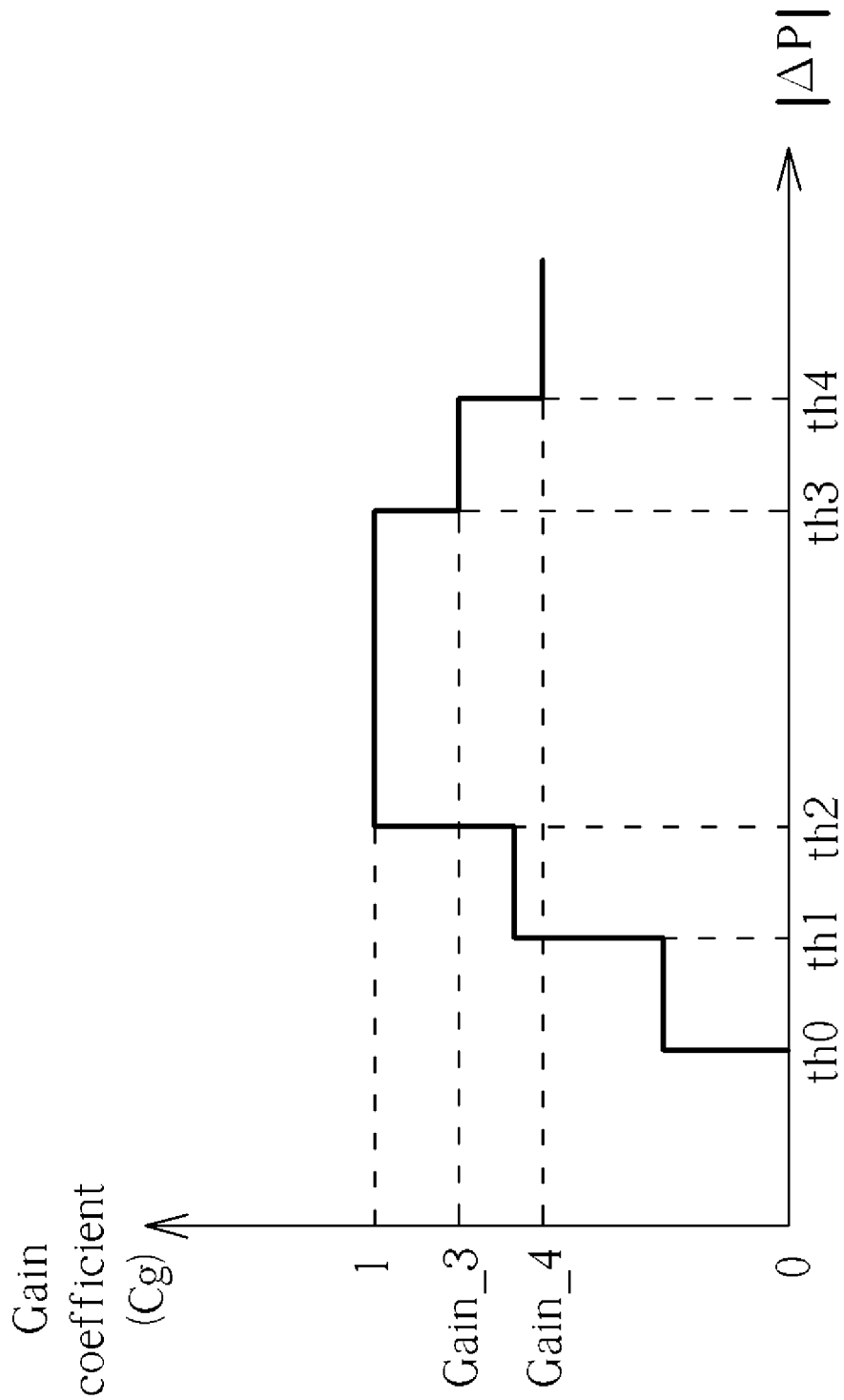
FIG. 5 is an exemplary diagram illustrating the relationship between an absolute value of the edge detection result and a gain coefficient.

In this embodiment, the gain coefficient Cg of the target pixel is determined according to the edge detection result (Step 406). FIG. 5 is an exemplary diagram illustrating the relationship between absolute value of the edge detection result |ΔP| and the gain coefficient Cg. As shown in FIG. 5, absolute values of the edge detection result |ΔP| are divided into six regions, where the absolute values of edge detection result |ΔP| between two adjacent regions are th0, th1, th2, th3, and th4 respectively. When the absolute value of the edge detection result |ΔP| falls in a range between zero and th0, the step-wise gain controller 320 sets the gain coefficient of the target pixel to zero to thereby prevent the flicker due to noise interference. On the other hand, in order to prevent the "overshoot" issue mentioned before, when the absolute value of the edge detection result |ΔP| is greater than th3, the greater the absolute value of the edge detection result |ΔP|, the less the gain coefficient Cg, therefore the gain coefficient gain_4 is less than gain_3 shown in FIG. 5.

In the prior art coring operation unit 130, when the absolute value of the edge detection result |ΔP| is greater than the threshold value th_c, the edge detection result is equal to the coring operation result. Compared with the step-wise gain controller 320, the gain coefficient Cg is one. However, like the disadvantage of the image processing apparatus 100 mentioned before, the greater the difference between two gain coefficients Cg of two neighboring regions of the absolute value of the edge detection result |ΔP|, the more serious the flicker. Therefore, in the range between th0 and th2 shown in FIG. 5, the gain coefficient Cg increases as the absolute value of the edge detection result |ΔP| increases, thereby reducing the flicker.

Of course, in the range of the gain coefficient Cg from zero to one, the more regions of the absolute value of the edge detection result |ΔP| there are, the more steps of the gain coefficients there will be, and thus the slighter the flicker.

Please note that, the relationship between absolute value of the edge detection result |ΔP| and the gain coefficient Cg shown in FIG. 5 is for illustrative purposes only. Without departing from the spirit of the present invention, the number of regions and the corresponding gain coefficients can be determined by the designer's considerations. These alternative designs all fall in the scope of the present invention.

However, the image processing apparatus 300 can only enhance the obvious and clear edges with high contrast or severe brightness variation. If the unobvious and blurred edges with tiny brightness variations are to be enhanced, a band-pass filter is needed in the image processing apparatus.

Figure 6:
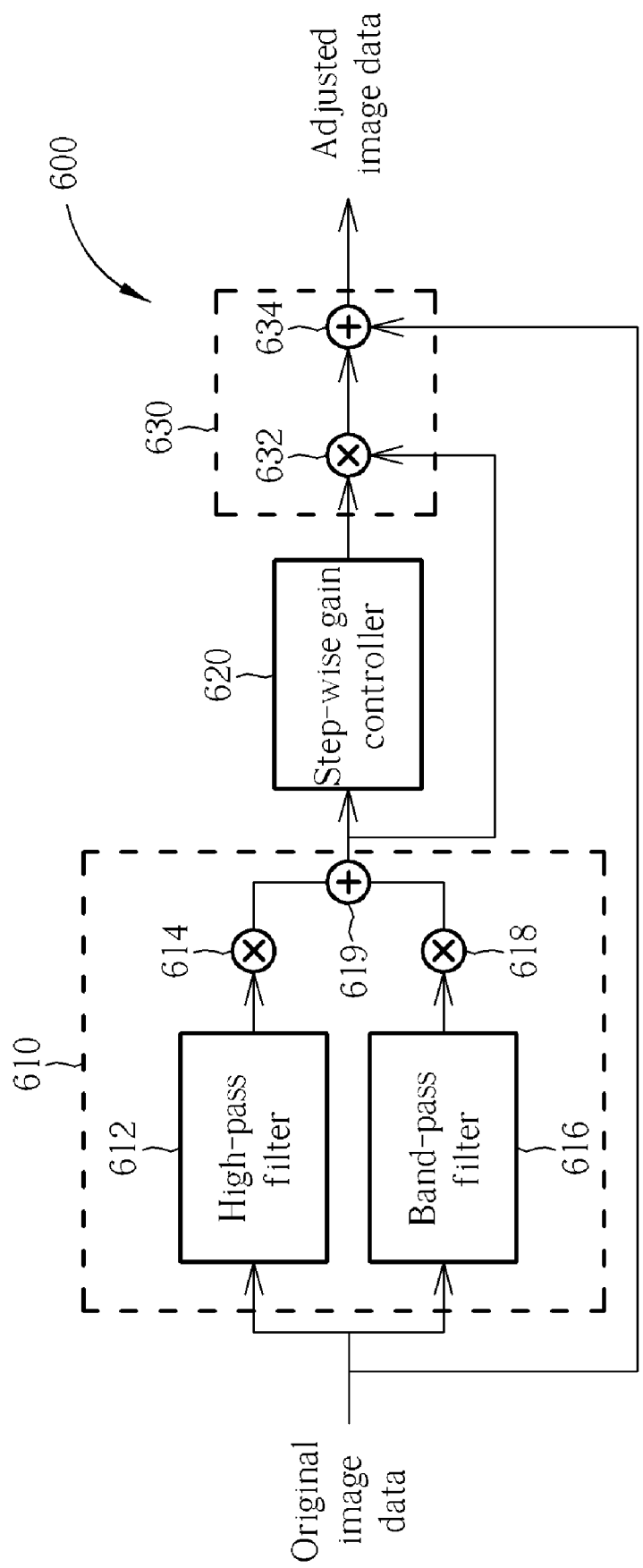
FIG. 6 is an image processing apparatus according to a second embodiment of the present invention.

FIG. 6 is an image processing apparatus 600 according to a second embodiment of the present invention. The image processing apparatus 600 comprises an edge detection module 610, a step-wise gain controller 620 and a calculation module 630. As shown in FIG. 6, the edge detection module 610 comprises a high-pass filter 612, a first multiplier 614, a band-pass filter 616, a second multiplier 618 and a first adder 619; and the calculation module 630 comprises a third multiplier 632 and a second adder 634.

Figure 7:
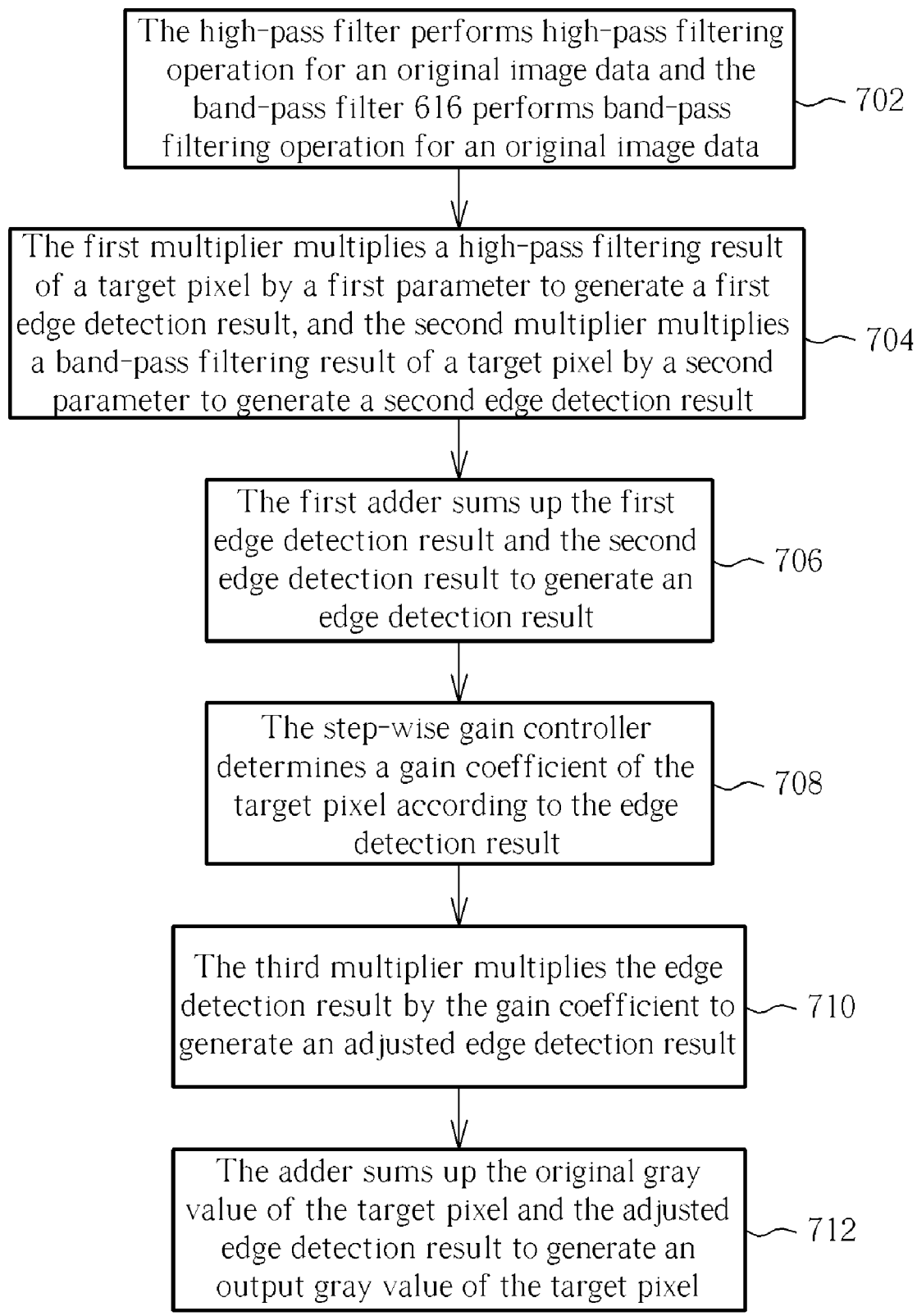
FIG. 7 illustrates a flowchart of the operations of the image processing apparatus shown in FIG. 6.

Please refer to FIG. 6 in conjunction with FIG. 7. FIG. 7 illustrates a flowchart of the operations of the image processing apparatus 600 shown in FIG. 6. Provided that the result is substantially the same, the steps are not limited to be executed according to the exact order shown in FIG. 7. Referring to the flowchart, the operations of the image processing apparatus 600 are further described as follows.

In Step 702, the high-pass filter 612 performs a high-pass filtering operation for the original image data and the band-pass filter 616 performs band-pass filtering for the same original image data. Then in Step 704, the first multiplier 614 multiplies a high-pass filtering result HPF of a target pixel by a first parameter kph to generate a first edge detection result, while the second multiplier 618 multiplies a band-pass filtering result BPF of a target pixel by a second parameter kbh to generate a second edge detection result. In Step 706, the first adder 619 sums up the first edge detection result and the second edge detection result to generate an edge detection result ΔP. In Step 708, the step-wise gain controller 620 determines a gain coefficient Cg of the target pixel according to the edge detection result ΔP. In Step 710, the third multiplier 632 multiplies the edge detection result ΔP by the gain coefficient Cg to generate an adjusted edge detection result ΔP'. And finally, in Step 712, the adder 634 sums up the original gray value P of the target pixel and the adjusted edge detection result ΔP' to generate an output gray value P' of the target pixel. The formulas of the above operations are as follows:

$$\Delta P = khp * HPF + kbp * BPF \quad (4)$$

$$\Delta P' = \Delta P * Cg \quad (5)$$

$$P' = P + \Delta P' \quad (6)$$

Therefore the operation of a pixel is completed, and then the image processing apparatus 600 sequentially performs the above-mentioned operations on every pixel to generate an adjusted image data.

Figure 8:
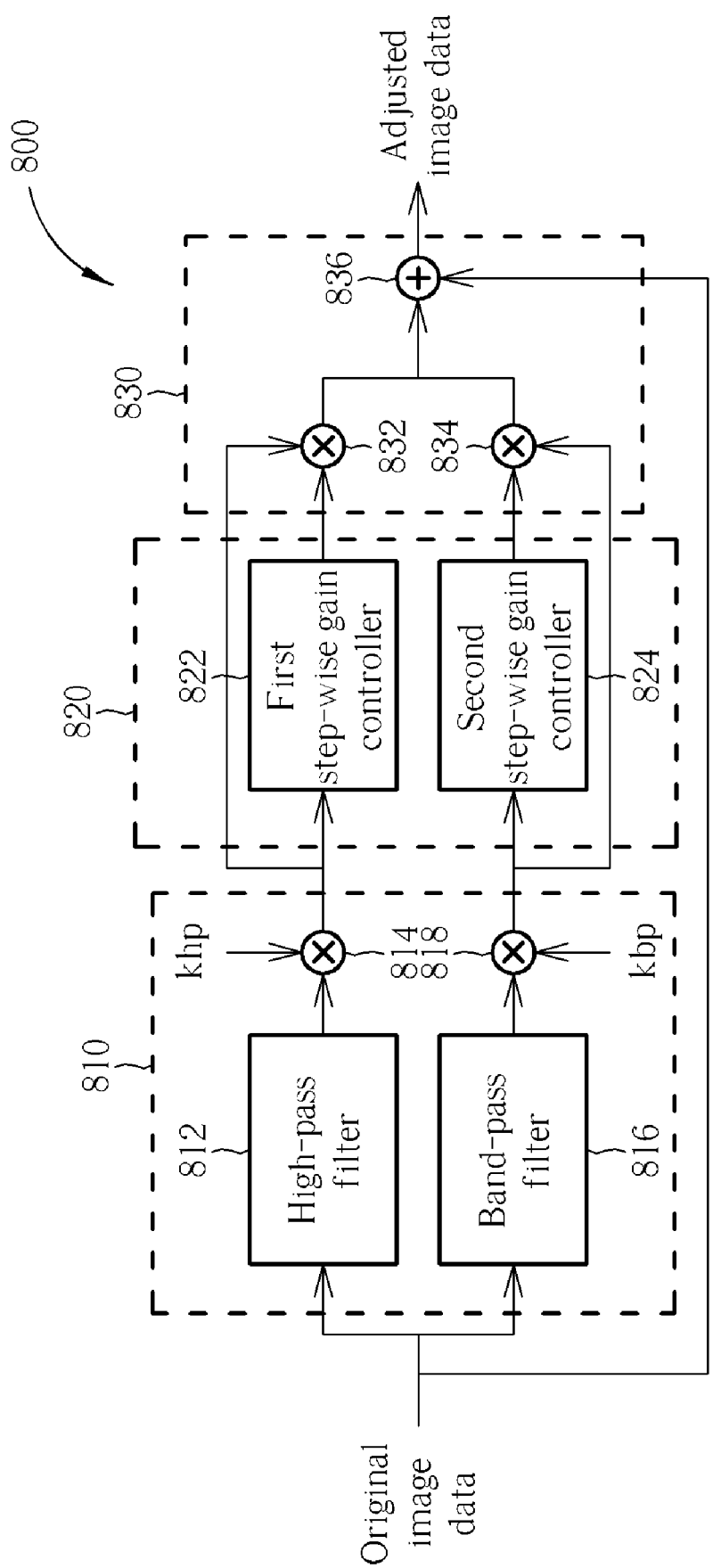
FIG. 8 is an image processing apparatus according to a third embodiment of the present invention.

FIG. 8 is an image processing apparatus 800 according to a third embodiment of the present invention. The image processing apparatus 800 comprises an edge detection module 810, a step-wise gain controlling module 820 and a calculation module 830. As shown in FIG. 8, the edge detection module 810 comprises a high-pass filter 812, a first multiplier 814, a band-pass filter 816 and a second multiplier 818; the step-wise gain controlling module 820 comprises a first step-wise gain controller 822 and a second step-wise gain controller 824; and the calculation module 830 comprises a third multiplier 832, a fourth multiplier 834 and an adder 836.

The operations of the image processing apparatus 800 are similar to perform the operations of the image processing apparatus 300 twice. In this exemplary embodiment, the image processing apparatus 800 comprises two step-wise gain controller and generates a first adjusted edge detection result and a second adjusted edge detection result. The adder 836 of the image processing apparatus 800 then sums up the original gray value of the target pixel, the first adjusted edge detection result and the second adjusted edge detection result to generate an output gray value of the target pixel. As a person skilled in this art can readily understand operations of the circuit components included in the image processing apparatus 800 after reading above disclosure, further description is omitted here for the sake of brevity.

Those skilled in the art will readily observe that numerous modifications and alterations of the device and method may be made while retaining the teachings of the invention.

What is claimed is:

1. An image processing apparatus, comprising:
   an edge detection module, for performing image edge detection for each pixel in an original image data and generating at least one edge detection result for a target pixel in the original image data;
   a step-wise gain controlling module, coupled to the edge detection module, for determining at least one gain coefficient of the target pixel according to the edge detection result, wherein when edge detection results are within a first region, the step-wise gain controlling module outputs a same first gain coefficient in response to each of the edge detection results, and when edge detection results are within a second region different from the first region, the step-wise gain controlling module outputs a same second gain coefficient in response to each of the edge detection results, where the second gain coefficient is different from the first gain coefficient; and
   a calculation module, coupled to the step-wise gain controlling module, for adjusting an original gray value of the target pixel to generate an output gray value of the target pixel according to the gain coefficient.

2. The apparatus of claim 1, wherein the edge detection module comprises:
   a high-pass filter for performing high-pass filtering operation on the original image data; and
   a first multiplier, coupled to the high-pass filter, for multiplying a high-pass filtering result of the target pixel by a first parameter to generate the edge detection result.

3. The apparatus of claim 2, wherein the calculation module comprises:
   a second multiplier, coupled to the step-wise gain controlling module, for multiplying the edge detection result by the gain coefficient of the target pixel to generate an adjusted edge detection result; and
   an adder, coupled to the second multiplier, for summing up the original gray value of the target pixel and the adjusted edge detection result to generate the output gray value of the target pixel.

4. The apparatus of claim 1, wherein the edge detection module comprises:
   a high-pass filter for performing high-pass filtering operation on the original image data;
   a first multiplier, coupled to the high-pass filter, for multiplying a high-pass filtering result of the target pixel by a first parameter to generate a first edge detection result;
   a band-pass filter for performing band-pass filtering operation on the original image data;
   a second multiplier, coupled to the band-pass filter, for multiplying a band-pass filtering result of the target pixel by a second parameter to generate a second edge detection result; and
   an adder, coupled to the first multiplier and the second multiplier, for summing up the first edge detection result and the second edge detection result to generate the edge detection result.

5. The apparatus of claim 4, wherein the calculation module comprises:
   a multiplier, coupled to the step-wise gain controlling module, for multiplying the edge detection result by the gain coefficient of the target pixel to generate an adjusted edge detection result; and
   an adder, coupled to the multiplier, for summing up the original gray value of the target pixel and the adjusted edge detection result to generate the output gray value of the target pixel.

6. The apparatus of claim 1, wherein the step-wise gain controlling module comprises a first step-wise gain controller and a second step-wise gain controller; and the edge detection module comprises:
   a high-pass filter for performing high-pass filtering operation on the original image data;
   a first multiplier, coupled to the high-pass filter and the first step-wise gain controller, for multiplying a high-pass filtering result of the target pixel by a first parameter to generate a first edge detection result, wherein the first step-wise gain controller determines a first gain coefficient of the target pixel according to the first edge detection result;
   a band-pass filter for performing band-pass filtering operation on the original image data;
   a second multiplier, coupled to the band-pass filter and the second step-wise gain controller, for multiplying a band-pass filtering result of the target pixel by a second parameter to generate a second edge detection result, wherein the second step-wise gain controller determines a second gain coefficient of the target pixel according to the second edge detection result, and the calculation module adjusts the target pixel according to the first gain coefficient and the second gain coefficient.

7. The apparatus of claim 6, wherein the calculation module comprises:
   a first multiplier, coupled to the first step-wise gain controller, for multiplying the first edge detection result by the first gain coefficient of the target pixel to generate a first adjusted edge detection result;
   a second multiplier, coupled to the second step-wise gain controller, for multiplying the second edge detection result by the second gain coefficient of the target pixel to generate a second adjusted edge detection result; and
   an adder, coupled to the first multiplier and the second multiplier, for summing up the original gray value of the target pixel, the first adjusted edge detection result and the second adjusted edge detection result to generate the output gray value of the target pixel.

8. The apparatus of claim 1, wherein when an absolute value of the edge detection result falls within a step range between zero and a specific threshold value, the step-wise gain controlling module sets the gain coefficient of the target pixel to zero.

9. The apparatus of claim 1, wherein when an absolute value of the edge detection result falls within a first step range between a first threshold value and a second threshold value greater than the first threshold value, the step-wise gain controlling module sets the gain coefficient of the target pixel to a first value; and when the absolute value of the edge detection result falls within a second step range between the second threshold value and a third threshold value greater than the second threshold value, the step-wise gain controlling module sets the gain coefficient of the target pixel to a second value less than the first value.

10. An image processing method, comprising:
   performing an image edge detection for each pixel in an original image data and generating at least one edge detection result for a target pixel in the original image data;
   determining at least one gain coefficient of the target pixel according to the edge detection result, wherein when edge detection results are within a first region, the step-wise gain controlling module outputs a same first gain coefficient in response to each of the edge detection results, and when edge detection results are within a second region different from the first region, the step-wise gain controlling module outputs a same second gain coefficient in response to each of the edge detection results, where the second gain coefficient is different from the first gain coefficient; and
   adjusting an original gray value of the target pixel to generate an output gray value of the target pixel according to the gain coefficient.

11. The method of claim 10, wherein the step of performing image edge detection for each pixel in the original image data and generating at least one edge detection result for the target pixel in the original image data comprises:
   performing high-pass filtering operation on the original image data; and
   multiplying a high-pass filtering result of the target pixel by a first parameter to generate the edge detection result.

12. The method of claim 11, wherein the step of adjusting the original gray value of the target pixel to generate the output gray value of the target pixel according to the gain coefficient comprises:
   multiplying the edge detection result by the gain coefficient of the target pixel to generate an adjusted edge detection result; and
   summing up the original gray value of the target pixel and the adjusted edge detection result to generate the output gray value of the target pixel.

13. The method of claim 10, wherein the step of performing the image edge detection for each pixel in the original image data and generating at least one edge detection result for the target pixel in the original image data comprises:
   performing a high-pass filtering operation on the original image data;
   multiplying a high-pass filtering result of the target pixel by a first parameter to generate a first edge detection result;
   performing a band-pass filtering operation on the original image data;
   multiplying a band-pass filtering result of the target pixel by a second parameter to generate a second edge detection result; and
   summing up the first edge detection result and the second edge detection result to generate the edge detection result.

14. The method of claim 13, wherein the step of adjusting the original gray value of the target pixel to generate the output gray value of the target pixel according to the gain coefficient comprises:
   multiplying the edge detection result by the gain coefficient of the target pixel to generate an adjusted edge detection result; and
   summing up the original gray value of the target pixel and the adjusted edge detection result to generate the output gray value of the target pixel.

15. The method of claim 10, wherein the step of performing image edge detection for each pixel in the original image data and generating at least one edge detection result for the target pixel in the original image data comprises:
   performing a high-pass filtering operation on the original image data;
   multiplying a high-pass filtering result of the target pixel by a first parameter to generate a first edge detection result, wherein a first gain coefficient of the target pixel is determined according to the first edge detection result;
   performing a band-pass filtering operation on the original image data;
   multiplying a band-pass filtering result of the target pixel by a second parameter to generate a second edge detection result, wherein a second gain coefficient of the target pixel is determined according to the second edge detection result, and the target pixel is adjusted according to the first gain coefficient and the second gain coefficient.

16. The method of claim 15, wherein the step of adjusting the original gray value of the target pixel to generate the output gray value of the target pixel according to the gain coefficient comprises:
   multiplying the first edge detection result by the first gain coefficient of the target pixel to generate a first adjusted edge detection result;
   multiplying the second edge detection result by the second gain coefficient of the target pixel to generate a second adjusted edge detection result; and
   summing up the original gray value of the target pixel, the first adjusted edge detection result and the second adjusted edge detection result to generate the output gray value of the target pixel.

17. The method of claim 10, wherein when an absolute value of the edge detection result falls within a step range between zero and a specific threshold value, the gain coefficient of the target pixel is set to zero.

18. The method of claim 10, wherein when an absolute value of the edge detection result falls within a first step range between a first threshold value and a second threshold value greater than the first threshold value, setting the gain coefficient of the target pixel to a first value; and when the absolute value of the edge detection result falls within a second step range between the second threshold value and a third threshold value greater than the second threshold value, setting the gain coefficient of the target pixel to a second value less than the first value.

* * * * *